United States Patent
Saji et al.

(10) Patent No.: US 9,370,833 B2
(45) Date of Patent: Jun. 21, 2016

(54) CUTTING INSERT AND INDEXABLE ROTARY CUTTING TOOL

(71) Applicant: TUNGALOY CORPORATION, Iwaki-shi, Fukushima (JP)

(72) Inventors: Ryuichi Saji, Iwaki (JP); Souzou Kawasaki, Iwaki (JP)

(73) Assignee: Tungaloy Corporation, Iwaki-shi, Fukushima (JP)

( * ) Notice: Subject to any disclaimer, the term of this patent is extended or adjusted under 35 U.S.C. 154(b) by 663 days.

(21) Appl. No.: 13/757,837

(22) Filed: Feb. 3, 2013

(65) Prior Publication Data

US 2013/0170915 A1    Jul. 4, 2013

Related U.S. Application Data

(63) Continuation-in-part of application No. PCT/JP2012/061180, filed on Apr. 26, 2012.

(30) Foreign Application Priority Data

Apr. 26, 2011  (JP) ................. 2011-097771

(51) Int. Cl.
*B23B 51/00* (2006.01)
*B23C 5/20* (2006.01)
(Continued)

(52) U.S. Cl.
CPC .............. *B23C 5/207* (2013.01); *B23B 27/141* (2013.01); *B23B 51/02* (2013.01); *B23B 51/048* (2013.01); *B23B 2200/0409* (2013.01); *B23B 2200/0419* (2013.01); *B23B 2200/0423* (2013.01); *B23B 2200/125* (2013.01); *B23B 2200/201* (2013.01);
(Continued)

(58) Field of Classification Search
CPC .. B23B 27/16; B23B 27/164; B23B 27/1651; B23B 2200/0404; B23B 2200/0438; B23B 2200/0447; B23C 2200/0405; B23C 2200/0422; B23C 2200/0433; B23C 2200/201; B23C 2200/208; B23C 2200/221; B23C 2200/082; Y10T 407/1924; Y10T 407/23
USPC ................... 407/113, 42
See application file for complete search history.

(56) References Cited

U.S. PATENT DOCUMENTS 4,367,991 A    1/1983  Graffe et al.
4,645,384 A *  2/1987  Shimomura ............ B23C 5/207
                                                       407/113

(Continued)

OTHER PUBLICATIONS

Extended European search report issued Sep. 17, 2014 in European counterpart application (No. 12777361.2).
(Continued)

*Primary Examiner* — Daniel Howell
*Assistant Examiner* — Nicole N Ramos
(74) *Attorney, Agent, or Firm* — Womble Carlyle

(57) ABSTRACT

A cutting insert has a first cutting edge provided with a chip breaker suitable for cutting an outermost region of a hole. The cutting insert has a substantially polygonal upper face, a substantially polygonal lower face, and a plurality of side faces extending between the upper face and the lower face. The plurality of side faces include a main side face constituting a flank of a linear cutting edge and a sub side face constituting a flank of a corner cutting edge; the main side face has a relief angle of 0°, the sub side face has a relief angle larger than 0°. A second cutting edge is further provided at an intersection portion between the main side face and the lower face.

19 Claims, 13 Drawing Sheets

(51) Int. Cl.
 *B23B 27/14* (2006.01)
 *B23B 51/04* (2006.01)
 *B23B 51/02* (2006.01)

(52) U.S. Cl.
 CPC ..... *B23B 2200/283* (2013.01); *B23B 2200/286* (2013.01); *B23B 2205/12* (2013.01); *B23B 2251/50* (2013.01); *Y10T 407/1906* (2015.01); *Y10T 407/23* (2015.01); *Y10T 407/235* (2015.01); *Y10T 407/24* (2015.01); *Y10T 408/905* (2015.01); *Y10T 408/909* (2015.01)

(56) References Cited

U.S. PATENT DOCUMENTS

| | | | |
|---|---|---|---|
| 4,930,945 A | 6/1990 | Arai et al. | |
| 4,954,021 A * | 9/1990 | Tsujimura | B23C 5/207 407/34 |
| 4,990,036 A * | 2/1991 | Eklund | B23B 27/141 407/113 |
| 5,114,282 A * | 5/1992 | Pawlik | B23C 5/2221 407/40 |
| 5,226,761 A * | 7/1993 | Satran | B23B 27/141 407/114 |
| 5,622,461 A * | 4/1997 | Tukala | B23B 51/048 407/113 |
| 6,413,023 B1 | 7/2002 | Nagashima | |
| 6,733,214 B2 | 5/2004 | Scherbarth | |
| 7,237,985 B2 * | 7/2007 | Leuze | B23B 27/145 407/113 |
| 7,410,332 B2 * | 8/2008 | Scherbarth | B23C 5/202 407/113 |
| 2005/0249559 A1 | 11/2005 | Lof et al. | |
| 2007/0041798 A1 * | 2/2007 | Nasu | B23B 27/141 407/114 |
| 2007/0077130 A1 * | 4/2007 | Ley | B23B 27/1607 407/114 |
| 2008/0075547 A1 * | 3/2008 | Wolf | B23B 27/141 408/147 |
| 2009/0245949 A1 * | 10/2009 | Takahashi | B23B 27/145 407/42 |
| 2010/0150671 A1 * | 6/2010 | Oprasic | B23C 5/207 407/42 |
| 2010/0178122 A1 * | 7/2010 | Bae | B23B 51/048 408/223 |
| 2010/0183386 A1 * | 7/2010 | Heinloth | B23B 5/18 407/113 |
| 2010/0202839 A1 * | 8/2010 | Fang | B23C 5/109 407/53 |
| 2012/0275868 A1 | 11/2012 | Saito et al. | |

OTHER PUBLICATIONS

International Preliminary Report on Patentability (IPRP) dated Nov. 7, 2013 issued in PCT counterpart application (No. PCT/JP2012/061180) with English Translation.

International Search Report dated Jul. 24, 2012 issued in PCT counterpart application (No. PCT/JP2012/061180).

* cited by examiner

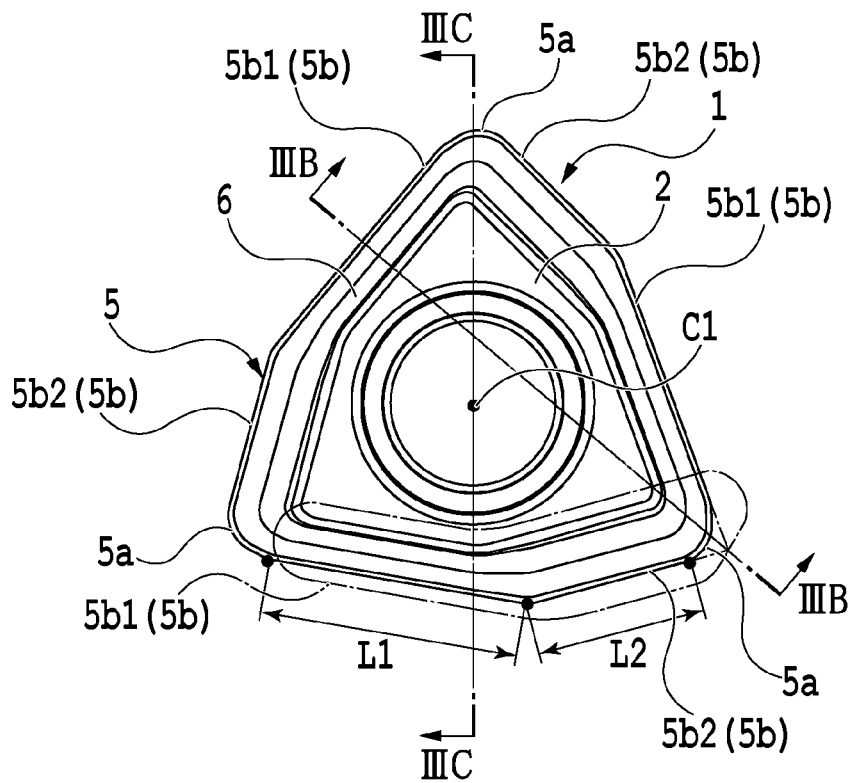
FIG.3A
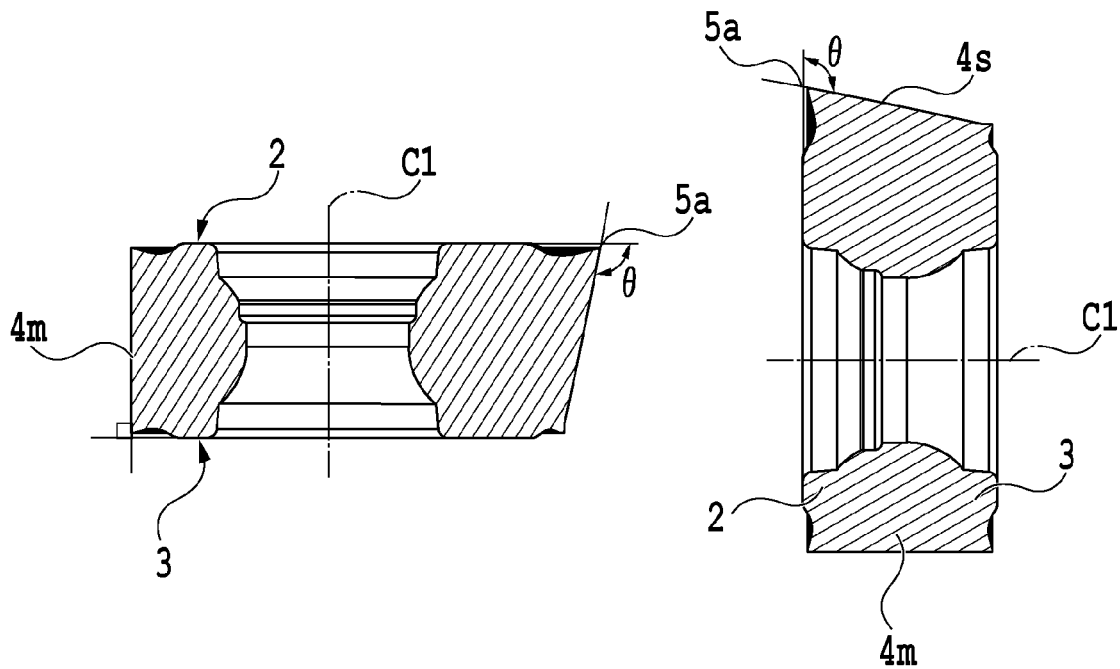
FIG.3B  FIG.3C

CUTTING INSERT AND INDEXABLE ROTARY CUTTING TOOL

CROSS-REFERENCE TO RELATED APPLICATIONS

This application is a continuation-in-part of PCT application No. PCT/JP2012/061180, filed Apr. 26, 2012 and published as WO 2012/147836, which claims the benefit of Japanese Patent Application 2011-097771, filed Apr. 26, 2011. The contents of the aforementioned applications are incorporated by reference in their entirety.

BACKGROUND OF THE INVENTION

Field of the Invention

The present invention relates to a cutting insert used for a tool for cutting and an indexable rotary cutting tool using this cutting tool.

As a cutting insert used in an indexable rotary cutting tool such as a drill, a so-called positive cutting insert having a relief angle formed on a side face is known. The benefit of the positive cutting insert is that a cutting insert of the same format can be used for each of cutting of an outermost region of a hole to be machined and cutting of a central region of the hole to be machined (See Japanese Patent Laid-Open No. 2003-62712, for example). In the case of the cutting insert disclosed in Japanese Patent Laid-Open No. 2003-62712, a cutting edge on a side of a short side is used for the cutting of the outermost region of the hole to be machined, while a cutting edge on a side of a long side is used for the cutting of the central region of the hole to be machined.

SUMMARY OF THE INVENTION

In the positive cutting insert as in Japanese Patent Laid-Open No. 2003-62712, a chip breaker for the cutting edge for cutting the outermost region of the hole and the chip breaker for the cutting edge for cutting the central region of the hole are both formed on an upper face. Therefore, it is difficult to design a chip breaker having a shape for optimizing cutting efficiency of the respective cutting edges. That is, an area on the upper face of the cutting insert is limited, and if the chip breaker for one of the cutting edges is designed optimally, the degree of freedom of an area and a depth in designing the chip breaker for the other cutting edge deteriorates, and optimal designing of the other chip breaker might not be possible. In some cases, it is likely that discharge efficiency of chips of the other chip breaker deteriorates conversely.

One of objects of the present invention is to provide a cutting insert capable of designing an optimal shape for each of the chip breaker for the cutting edge used for cutting of the outermost region of the hole to be machined and the chip breaker for the cutting edge used for cutting of the central region of the hole, and to provide an indexable rotary cutting tool using this cutting insert.

A cutting insert of the present invention is a plate-like cutting insert including:
a substantially polygonal upper face;
a substantially polygonal lower face; and
a plurality of side faces extending between the upper face and the lower face, wherein,
the cutting insert comprises a first cutting edge formed at an intersection portion where the upper face and the plurality of side faces intersect with each other;
the first cutting edge comprises at least one corner cutting edge formed at a corner portion of the upper face and curved, and at least one linear cutting edge formed linearly;
the plurality of side faces comprise at least one main side face including a plane constituting a flank of the at least one linear cutting edge, and at least one sub side face constituting a flank of the at least one corner cutting edge;
the at least one main side face comprises a relief angle of 0°;
the at least one sub side face comprises a relief angle larger than 0°; and
the cutting insert comprises at least one second cutting edge formed at the intersection portion where the at least one main side face and the lower face intersect with each other.

The indexable rotary cutting tool of the present invention is an indexable rotary cutting tool provided with a plurality of the above cutting inserts in a tool body, wherein:
in the plurality of the cutting inserts (1), at least one cutting insert is arranged so that a second cutting edge is involved in cutting; and
in the sub side faces of the cutting insert arranged so that the second cutting edge is involved in the cutting, a rotation trajectory drawn by each ridge line of the sub side face connected to the second cutting edge involved in the cutting and located closest to the center side of the tool body overlaps with a rotation trajectory drawn by the first cutting edge of the cutting insert arranged so that the first cutting edge is involved in the cutting.

According to the present invention, since rake faces of the first and second cutting edges are formed on the upper face and the lower face, the chip breaker of each cutting edge can be formed by being separated to the upper face and the lower face. As a result, optimal designing of the chip breaker for the respective cutting edges is made possible.

Further features of the present invention will become apparent from the following description of exemplary embodiments (with reference to the attached drawings).

BRIEF DESCRIPTION OF THE DRAWINGS

FIG. 3A is a top view of the cutting insert in FIG. 1;

FIG. 3B is a cross-sectional view along IIIB-IIIB line in FIG. 3A;

FIG. 3C is a cross-sectional view along IIIC-IIIC line in FIG. 3A;

DETAILED DESCRIPTION

Figure 1:
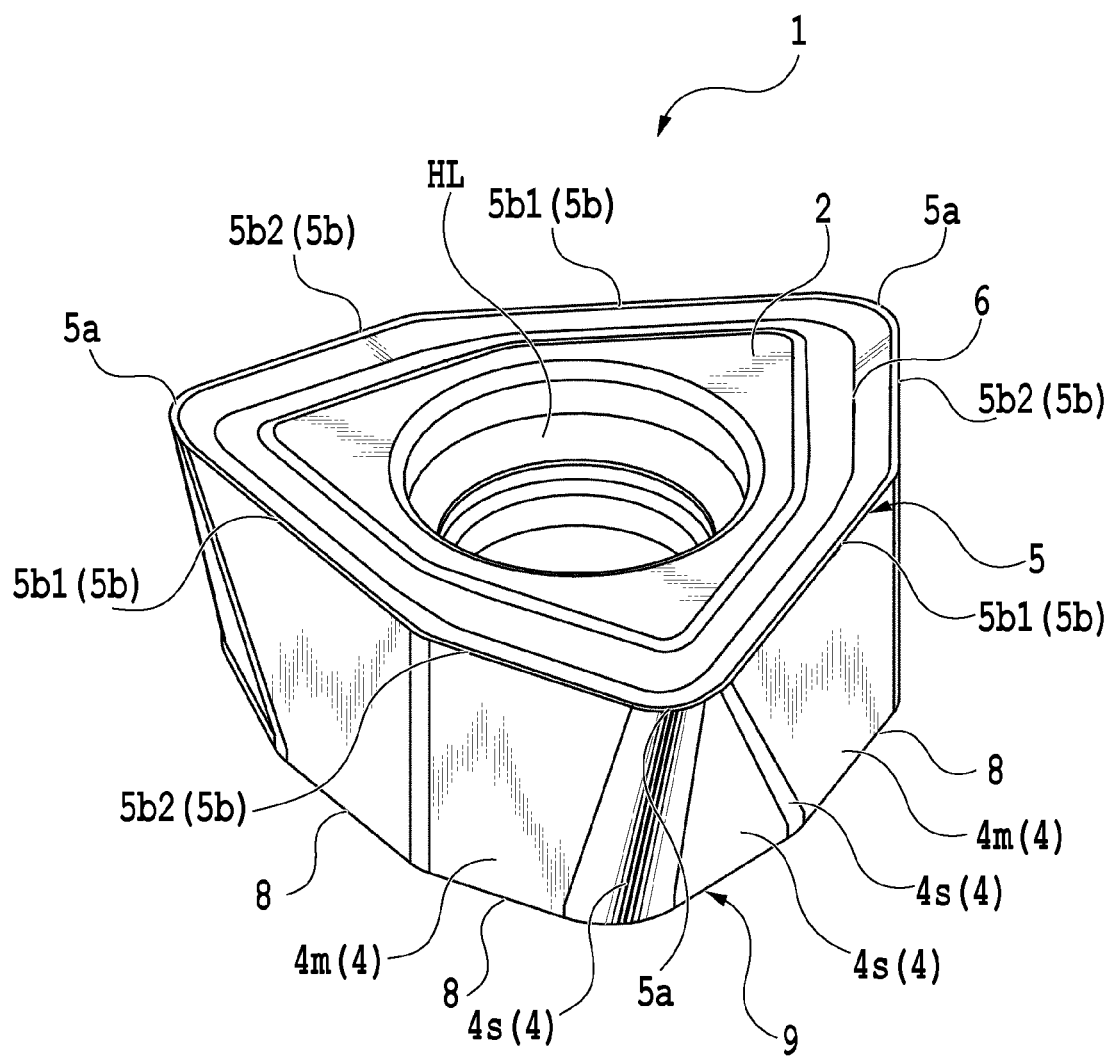
FIG. 1 is a perspective view of a cutting insert according to a first embodiment of the present invention when viewed from an upper face side.
Figure 2:
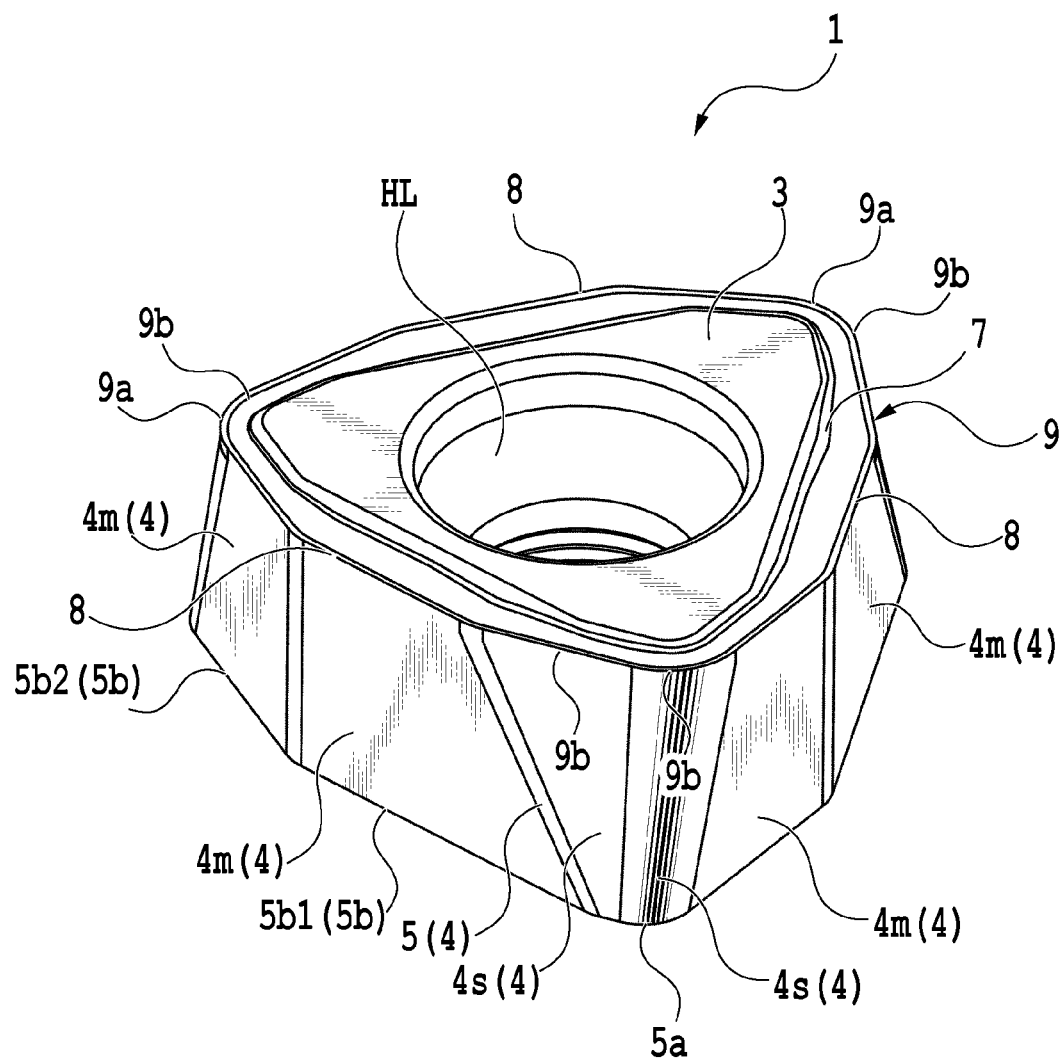
FIG. 2 is a perspective view of the cutting insert in FIG. 1 when viewed from a lower face side.

Hereinafter, the cutting insert according to an embodiment of the present invention and the indexable rotary cutting tool will be described by referring to the attached drawings.

(First Embodiment)

A cutting insert of the embodiment is used for an indexable drill and the great feature of this cutting insert is that rake faces having different use applications are formed on both an upper face and a lower face, respectively.

As illustrated in FIGS. 1 to 4, the cutting insert 1 of the embodiment is a plate-like body having an upper face 2 with a substantially hexagonal shape and a lower face 3 with a substantially enneagonal shape. A mounting hole HL for being attached to a tool body penetrating the upper face 2 and the lower face 3 is formed at a center part of the upper face 2 and the lower face 3. A part of the upper face 2 of the cutting insert 1 functions as a rake face when the cutting insert 1 is used for cutting an outermost region of a hole. In contrast, a part of the lower face 3 facing opposite to the upper face 2 functions as a rake face when the cutting insert 1 is used for cutting a central region of the hole. A plurality of side faces 4 extending between the upper face 2 and the lower face 3 function as flanks.

An outer cutting edge 5 is formed over an entire region of an upper intersection portion between the upper face 2 and the flank 4. The outer cutting edge 5 is a cutting edge for cutting the outermost region of the hole. The outer cutting edge 5 includes three curved corner cutting edges 5a formed at corner portions of the upper face 2, and two linear cutting edges (5b1 and 5b2) connected to each other and arranged between each pair of two corner cutting edges 5a. One end portion of each of the two connected linear cutting edges (5b1 and 5b2) is connected to an associated corner cutting edge 5a. More specifically, the corner cutting edge 5a and the two linear cutting edges 5b, indicated by a portion surrounded by a broken line in FIG. 3A constitute one cutting edge group. Therefore, the outer cutting edge 5 is constituted by three cutting edge groups.

The two linear cutting edges (5b1 and 5b2) belonging to one cutting edge group include first and second linear cutting edges 5b1 and 5b2. The first linear cutting edge 5b1 and the second linear cutting edge 5b2 intersect with each other at an obtuse angle. A length L1 of the first linear cutting edge 5b1 is larger than a length L2 of the second linear cutting edge 5b2. The outer shape of the upper face 2 is 120° rotationally symmetric with respect to a central axis line C1 of the mounting hole HL. However, the outer shape of the upper face 2 is a bilaterally asymmetric shape without a symmetric axis line in any direction on top view illustrated in FIG. 3A. In other words, the upper face 2 is not mirror symmetric with respect to any plane passing through the insert 1 and containing the central axis line C1. It should be noted that the benefit of the outer shape of this upper face 2 will be described later.

The plurality of faces 4 constituting the flank forming the plurality of the above-described cutting edges with the upper face 2 has different sizes of relief angles in accordance with the corresponding cutting edges. In the plurality of side faces 4, the side face 4m functioning as a flank for the two linear cutting edges 5b1 and 5b2 has a relief angle of 0°. Hereinafter, this side face will be referred to as a main side face 4m. As illustrated in FIGS. 3B and 3C, the main side face 4m is orthogonal to a reference face of the upper face 2 and the lower face 3 (that is, a reference face orthogonal to the central axis line C1). The main side face 4m includes a plane. In the plurality of side faces 4, the relief angle of the side face 4s connected to the corner cutting edge 5a is θ° (θ>0°). Hereinafter, this side face will be referred to as a sub side face 4s. The sub side face 4s is inclined in a direction towards the central axis line C1 of the cutting insert 1 from the upper face 2 to the lower face 3. At a lower intersection portion 9 between each main side face 4m and the lower face 3, an inner cutting edge 8 is formed. Therefore, the inner cutting edge 8 is formed only in a region connected to the main side face 4m in the lower intersection portion 9 where the lower face 3 and the plurality of side faces 4 intersect with each other and is not formed in a region connected to the sub side face 4s. The inner cutting edge 8 is a cutting edge for cutting the central region of the machined hole and is a cutting edge for cutting mainly a region not cut by the outer cutting edge 5.

On the upper face 2, an upper chip breaker 6 for the outer cutting edge 5 which will be described later is formed, while on the lower face 3, a lower chip breaker 7 for the inner cutting edge 8 which will be described later is formed. In the cutting of the outermost region of the hole, since it is necessary to generate chips which can be discharged more easily, the upper chip breaker 6 for the outer cutting edge 5 has a groove width larger than that of the lower chip breaker 7 for the inner cutting edge 8 and is formed shallow, as is known from FIGS. 1 to 4.

As described above, the outer cutting edge 5 is formed on the upper face 2 and the inner cutting edge 8 is formed on the lower face 3, and thus, when the shape of a chip breaker for one of the cutting edges is to be designed, it is not necessary to consider the specification of the chip breaker for the other cutting edge. That is, since only the outer cutting edge 5 is formed on the upper face 2, the entire upper face 2 can be used only for the design of the upper chip breaker 6 suitable for cutting of an outer periphery. Similarly, since only the inner cutting edge 8 is formed on the lower face 3, the entire lower face 3 can be used only for the design of the lower chip breaker 7 suitable for cutting of the center. That is, the cutting insert 1 is capable of independently designing the two types of the chip breakers for the two types of the cutting edges having different cutting regions. As a result, the indexable rotary cutting tool such as a drill to which the cutting insert 1 is applied has further improved chip discharge performances including dividing of chips into smaller pieces, than before. Moreover, when the size of the rake face is relatively small, it was necessary to take into consideration the relationship between the two types of the chip breakers previously, but since there is no such need for the cutting insert 1, the cutting insert 1 is effective when it is used for an indexable drill for a relatively small machined hole diameter and the like.

The cutting insert 1 is provided with both the outer cutting edge 5 and the inner cutting edge 8. Therefore, it can be used 3 times as an insert for cutting the outermost region of the hole and 3 times as an insert for cutting the central region of the hole, that is, 6 times in total. In addition, since the outer cutting edge 5 and the inner cutting edge 8 are completely separated from each other, an accidental defect caused in the outer cutting edge 5, for example, does not affect the number of times of use as the insert for cutting the central region of the hole. Naturally, the same applies to the other case where the accidental defect is caused in the inner cutting edge 8.

Though the cutting insert 1 can be used both on the upper and lower faces as a so-called negative cutting insert, a radial rake can be arranged at 0° or an orthonormal angle in the same way as the positive cutting insert. That is, because when the cutting insert 1 is arranged at a radial rake of 0°, a portion which should essentially have interfered with an inner wall of the machined hole in the case of a negative insert corresponds to the sub side face 4s to which a relief angle is given and the sub side face 4s and the inner wall of the machined hole do not interfere with each other. Then, due to the arrangement at a radial rake of 0°, a load on the outer cutting edge 5 is reduced, and an accidental defect does not easily occur. Furthermore, when the cutting insert 1 is arranged at a radial rake of 0° or a positive angle, generated chips separate away from a direction toward the inner wall of the machined hole in comparison with the case where the cutting insert 1 is arranged at a negative radial rake angle. Therefore, the chips enter into the chip discharge groove smoothly without excessively making contact with the inner wall of the machined hole and are easily discharged.

Subsequently, one embodiment of the indexable rotary cutting tool of the present invention will be described using an example of an indexable drill. This indexable drill (hereinafter referred to as a "drill 10") is, as illustrated to FIGS. 5A to 6B, constituted by attaching the above-described cutting insert 1 to the two insert seats 12 formed at a leading end of the tool body 11. On the side face of the tool body 11, two twisted chip discharge grooves 13 (13a, 13b) are formed, and generated chips are discharged to the outside of the hole through the grooves.

The insert seat 12 in the drill 10 is provided with two types of insert seats, that is, a insert seat when the cutting insert 1 is used for the outermost region cutting of the hole (hereinafter referred to as an "outer insert seat 12a") and a insert seat when the cutting insert 1 is used for the central region cutting of the hole (hereinafter referred to as a "center-side insert seat 12b"). That is, the outer insert seat 12a is a position used in the case where the lower face 3 faces a bottom face of the outer insert seat 12a and the cutting insert 1 is arranged so that the outer cutting edge 5 is operative and involved in cutting. In contrast, the center-side insert seat 12b is a position used in the case where the upper face 2 faces a bottom face of the center-side insert seat 12b and the cutting insert 1 is arranged so that the inner cutting edge 8 is operative and involved in cutting.

Figure 4:
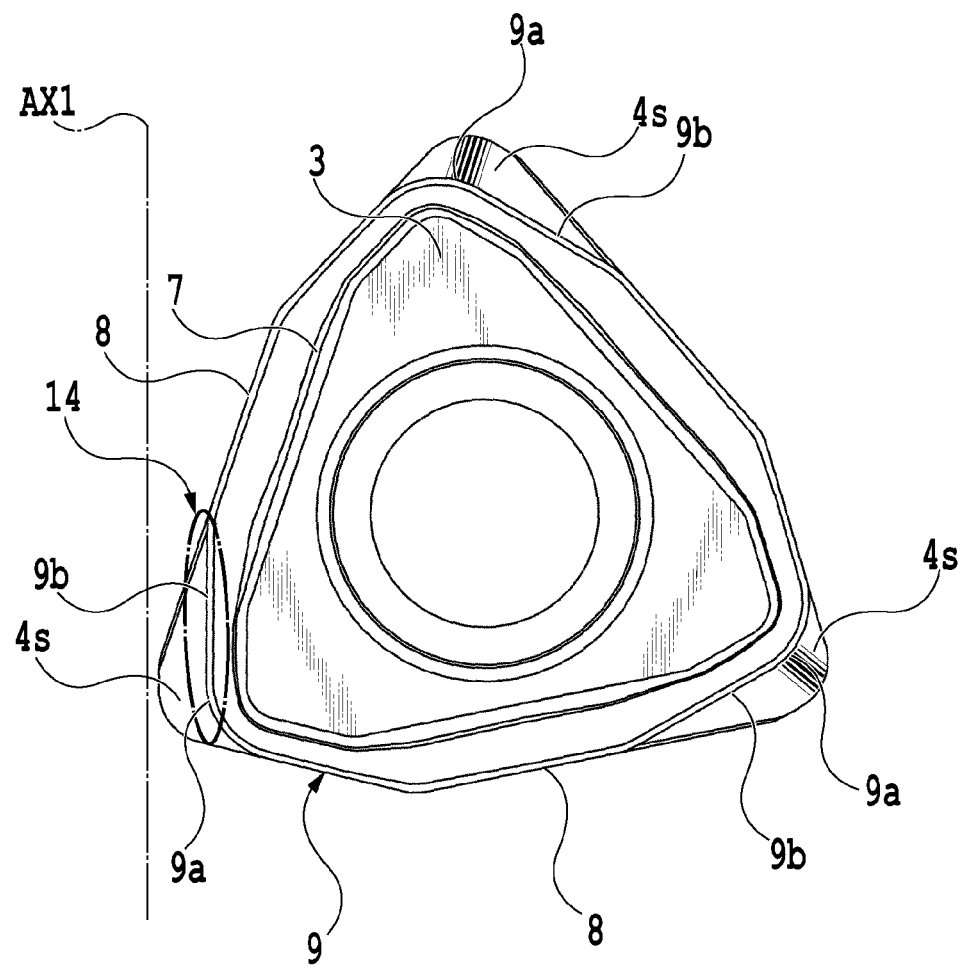
FIG. 4 is a bottom view of the cutting insert in FIG. 1.
Figure 5A:
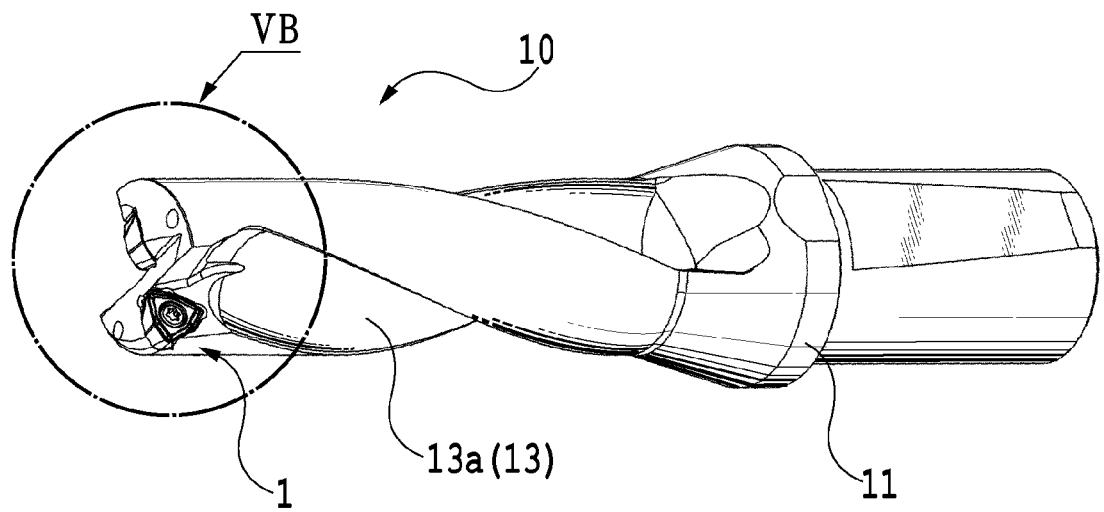
FIG. 5A is an appearance perspective view of an indexable drill as an indexable rotary cutting tool according to the first embodiment of the present invention when viewed from the side where an outer insert seat is located.
Figure 5B:
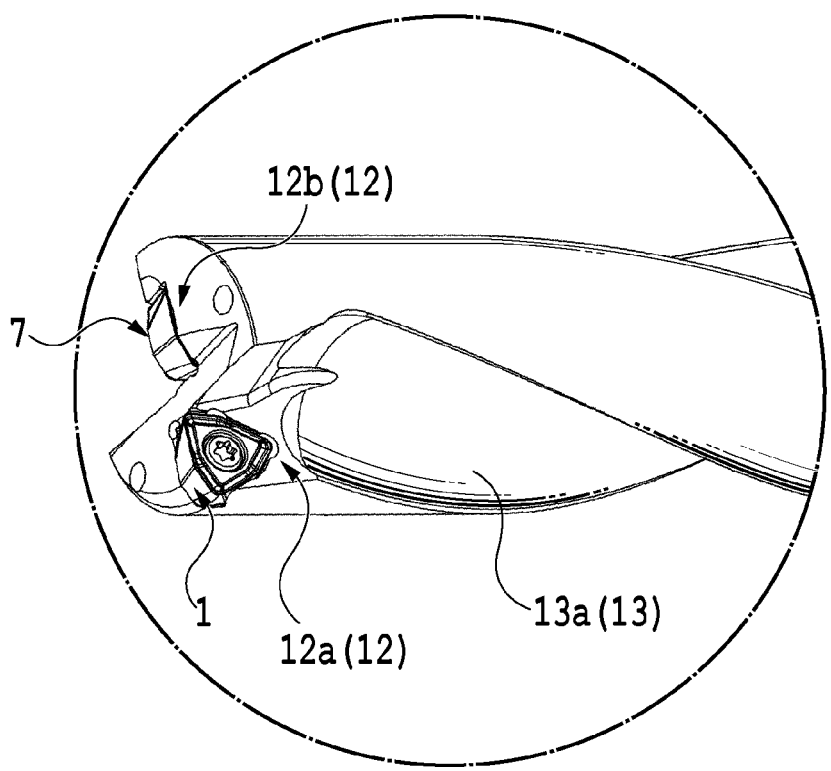
FIG. 5B is an enlarged perspective view of a circle VB in FIG. 5A.
Figure 6A:
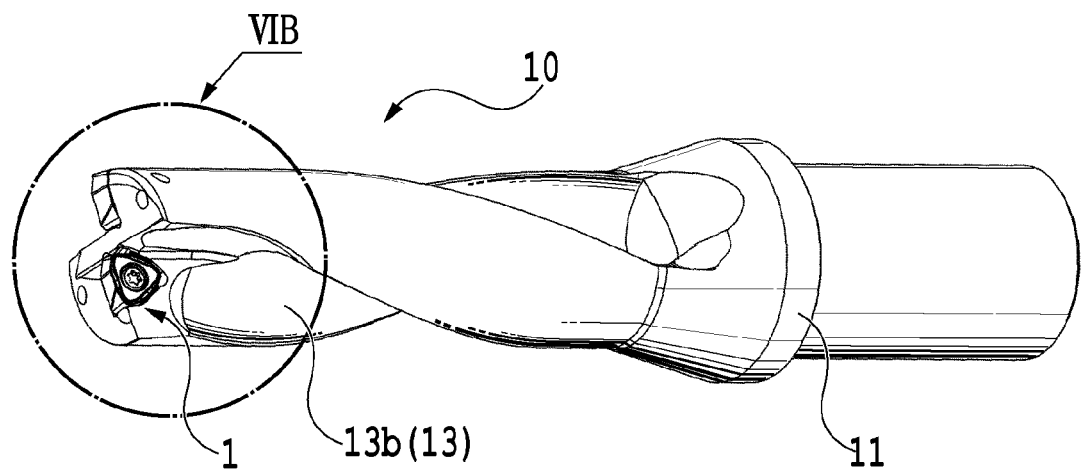
FIG. 6A is a perspective view of the drill in FIG. 5A when viewed from the side where a central insert seat is located.
Figure 6B:
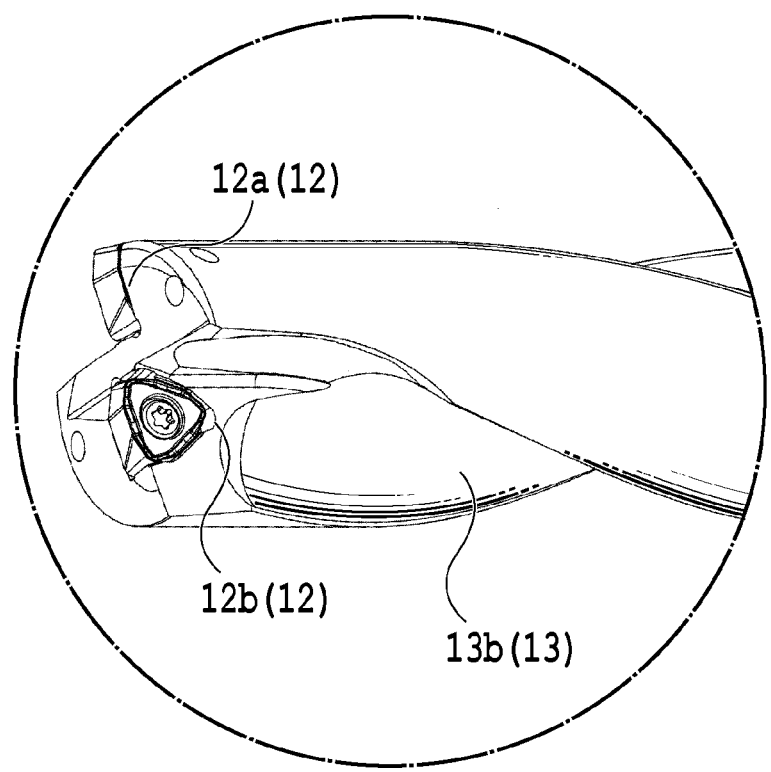
FIG. 6B is an enlarged perspective view of a circle VIB of FIG. 6A.

In this drill 10, in the cutting insert 1 arranged so that the inner cutting edge 8 is involved in the cutting, a rotation trajectory drawn by each ridge line of the sub side face 4s corresponding to the inner cutting edge 8 involved in the cutting and located closest to the side of the axis of rotation AX1 of the tool body overlaps with the rotation trajectory drawn by the outer cutting edge 5 of the cutting insert 1 arranged so that the outer cutting edge 5 is involved in the cutting. That is, as illustrated in FIG. 4, when the cutting insert is arranged with the lower face 3 up, one of top portions is directed to a root direction of the tool body 11 as in the case of the figure. At this time, a portion 14 surrounded by a dotted line does not function as a cutting edge. Therefore, the cutting insert 1 needs to be arranged so that the rotation trajectory of this portion 14 is within a cutting region of the outer cutting edge 5 (a region swept by the outer cutting edge 5 when the tool makes a rotation). If the portion 14 is located outside the cutting region of the outer cutting edge 5, an uncut position is caused on a bottom of the machined hole. In order to avoid such situation, the arranging method of the cutting insert 1 with the lower face 2 up is adjusted. That is, the cutting insert 1 is arranged so that the region swept by the line obtained by projecting the portion 14 onto the bottom of the machined hole is contained within the cutting region of the outer cutting edge 5.

In the lower intersection portions 9 defining the outer shape of the lower face 3, where the lower face 3 and the plurality of side faces intersect with each other, the lower intersection portion connected to the sub side face 4s has a linear portion 9b and a curved portion 9a. When the lower face 3 of the cutting insert 1 is placed as a rake face, the cutting insert is arranged so that one of the plurality of linear portions 9b becomes parallel to an axis of rotation AX1 of the tool body 11 (See FIG. 4).

The bottom face of the outer insert seat 12a is formed so to have a shape matching the outer shape of the upper face 2 of the cutting insert 1 (outer profile shape of FIG. 3) with the upper face 2 up with respect to the bottom face, and the bottom face of the center-side insert seat 12b is formed so to have a shape matching the outer shape of the upper face 2 of the cutting insert 1 (outer profile shape of FIG. 4) with the upper face 2 down with respect to the bottom face. As described above, since the outer shape of the upper face 2 is bilaterally asymmetric on top view, the outer shape of the top view of the bottom face of the outer insert seat 12a and the outer shape of the top view of the bottom face of the center-side insert seat 12b are different from each other. Therefore, when the cutting insert 1 is to be attached to the outer insert seat 12a or the center-side insert seat 12b in an improper direction, the cutting insert 1 cannot be attached to each of the insert seats. Specifically, even when the cutting insert 1 is to be attached in a direction in which the bottom face of the outer insert seat 12a and the upper face 2 of the cutting insert 1 face each other or even when the cutting insert 1 is to be attached in a direction in which the bottom face of the center-side insert seat 12b and the lower face 3 of the cutting insert 1 face each other, the attachment is not possible.

The cutting insert 1 arranged on the outer insert seat 12a and the cutting insert 1 arranged on the center-side insert seat 12b both have negative axial rake angles. By the axial rakes of the two cutting inserts 1 being both negative, loads applied to the both cutting inserts 1 are balanced, and the drill 10 rotates stably. As a result, accuracy of a machined hole diameter is enhanced. Moreover, occurrence of chattering vibration is suppressed and a quality of the hole to be machined is improved.

Figure 7:
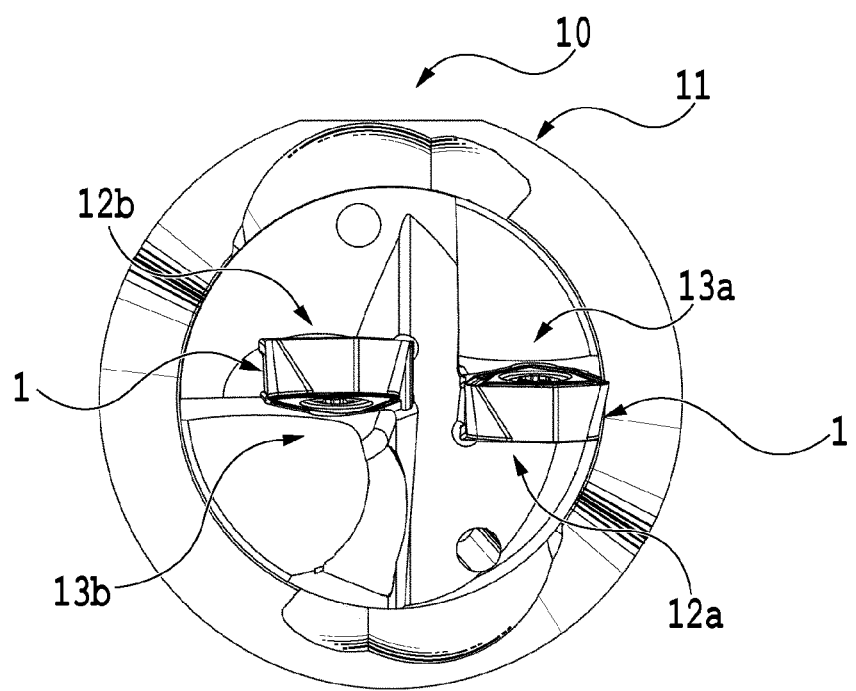
FIG. 7 is a front view of the drill in FIG. 5A on view of a leading edge.

FIG. 7 is a diagram of leading-end view of the drill 10. As illustrated in this figure, the chip discharge grooves 13 have shapes different from each other. That is, the chip discharge groove 13a on the outer insert seat 12a has a shape of an approximately ¼arc on the leading-edge view, while a groove face (thinning face) including a curved face having an appropriate length from the leading end is formed in a groove wall close to the center of the chip discharge groove 13b on the center-side insert seat 12b (See FIGS. 6A and 6B). By providing a difference in the shape between the two chip discharge grooves in accordance with shape characteristics of the chips generated from each of the cutting inserts 1, the chips discharged from the cutting insert arranged on each insert seat can be discharged to the rear end side of the tool body 11 efficiently, and rigidity of the drill 10 is ensured at the same time.

(Second Embodiment)

Figure 8A:
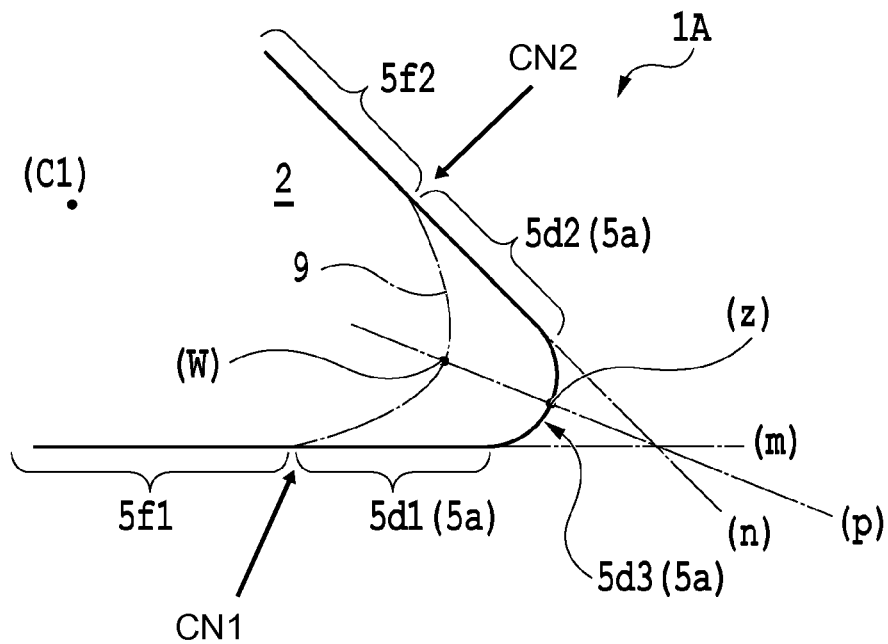
FIG. 8A is a partial enlarged diagram of one of cutting edge groups constituting an outer cutting edge of a cutting insert according to a second embodiment of the present invention.
Figure 8B:
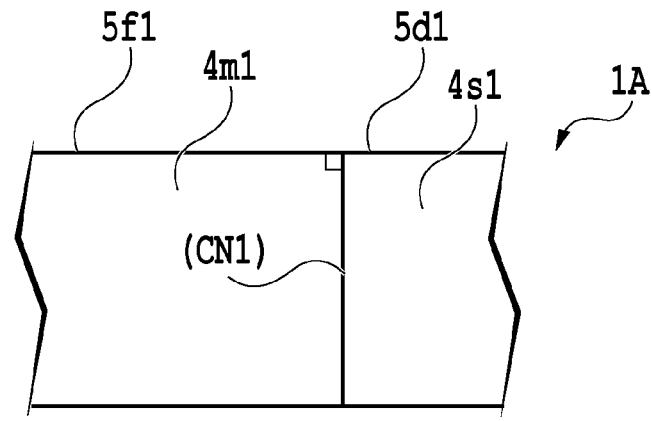
FIG. 8B is an enlarged view of one of side faces of the cutting insert in FIG. 8A.
Figure 8C:
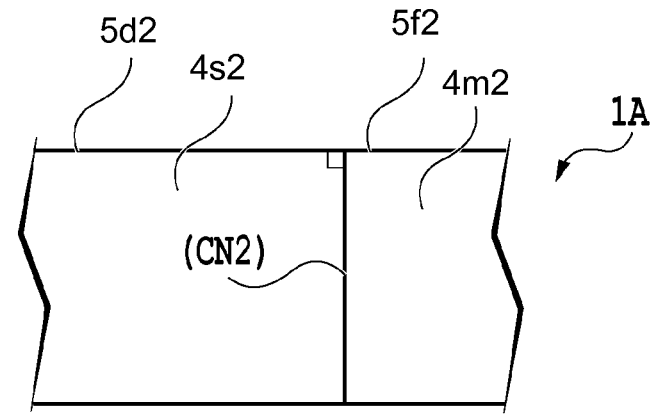
FIG. 8C is an enlarged view of the other side face of the cutting insert in FIG. 8A.
Figure 9:
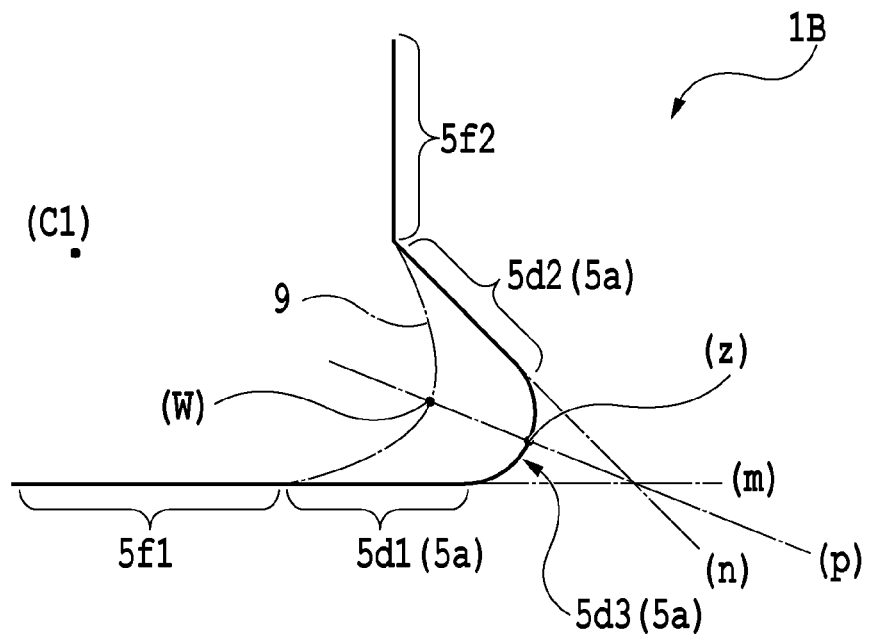
FIG. 9 is a partial enlarged view illustrating the cutting insert of the second embodiment in which a first long cutting edge and a first short cutting edge intersect with each other at an obtuse angle.

Subsequently, a cutting insert according to a second embodiment of the present invention will be described by referring to FIGS. 8A to 10. It should be noted that, in the drawings used in the description below, the portions having the functions similar to those in the above-described first embodiment are attached to the same reference numerals used in the above-illustrated drawings. FIGS. 8A-8C are partial enlarged views illustrated by enlarging one of cutting edge groups constituting the outer cutting edge of the cutting insert of the second embodiment. In a cutting insert 1A according to the embodiment, as illustrated in FIG. 8A, the corner cutting edge 5a is constituted by an arc-shaped cutting edge 5d3 arranged on a top portion, a first short cutting edge 5d1 extending from one of end portions of this arc-shaped cutting edge 5d3, and a second short cutting edge 5d2 extending from the other end portion.

Here, on top view, a virtual plane bisecting an angle formed by a virtual extension (m) of the first short cutting edge 5d1 and a virtual extension (n) of the second short cutting edge 5d2 and orthogonal to the upper face 2 is assumed to be (p). An intersection between this virtual plane (p) and the arc-shaped cutting edge 5d3 is assumed to be (z). An intersection between the above-described virtual plane (p), and the lower intersection portion 9 between the lower face 3 and the plurality of side faces 4, is assumed to be (W). In the embodiment, when the central axis line C1 of the cutting insert 1 is used as a reference, the intersection (z) is located radially outside the intersection (W). That is, the intersection (z) is located farther than the intersection (W) with respect to the central axis line C1.

As illustrated in FIG. 8B, in the cutting insert 1A of the second embodiment, when viewed from a direction perpendicular to a first main side face 4m1 corresponding to the first linear cutting edge 5f1 connected to the first short cutting edge 5d1 (hereinafter referred to as a "first long cutting edge"5f1), an intersection line CN1 between the first main side face 4m1 and a sub side face 4s1 corresponding to the first short cutting edge 5d1 is orthogonal to the first long cutting edge 5f1.

As illustrated in FIG. 8C, when viewed from a direction perpendicular to a second main side face 4m2 including a second linear cutting edge 5f2 connected to the second short cutting edge 5d2 (hereinafter referred to as a "second long cutting edge" 5f2), an intersection line CN2 between the second main side face 4m2 and a sub side face 4s2 corresponding to the second short cutting edge 5d2 is orthogonal to the second long cutting edge 5f2.

In the cutting insert 1 of the second embodiment, each cutting edge group has the above-described shape and the cutting insert 1A is formed by connecting those cutting edge groups to each other. That is, the flanks of the first long cutting edge 5f1 and the second long cutting edge 5f2 of the cutting insert 1 are formed so that the relief angle is 0°. The flanks of the first short cutting edge 5d1 and the second short cutting edge 5d2 of the corner cutting edge 5a of the cutting insert 1A are formed so that the relief angle exceeds 0°. By the cutting edge group being configured having such shape, strength of the corner cutting edge 5a in the second embodiment is improved from the cutting insert 1 of the first embodiment.

In the cutting insert 1A of the second embodiment, there is no limitation on an intersecting angle between the first long cutting edge 5f1 and the first short cutting edge 5d1 and an intersecting angle between the second long cutting edge 5f2 and the second short cutting edge 5d2. Therefore, for example, as illustrated in the first variation of FIG. 9, shapes can be employed in which the first long cutting edge 5f1 and the first short cutting edge 5d1 are arranged linearly and the second long cutting edge 5f2 and the second short cutting edge 5d2 intersect with each other at an obtuse angle. In this case, the relief to the hole wall, that is, an interval between the hole wall and the cutting insert 1B is largely ensured, and biting of the generated chips is prevented.

Figure 10:
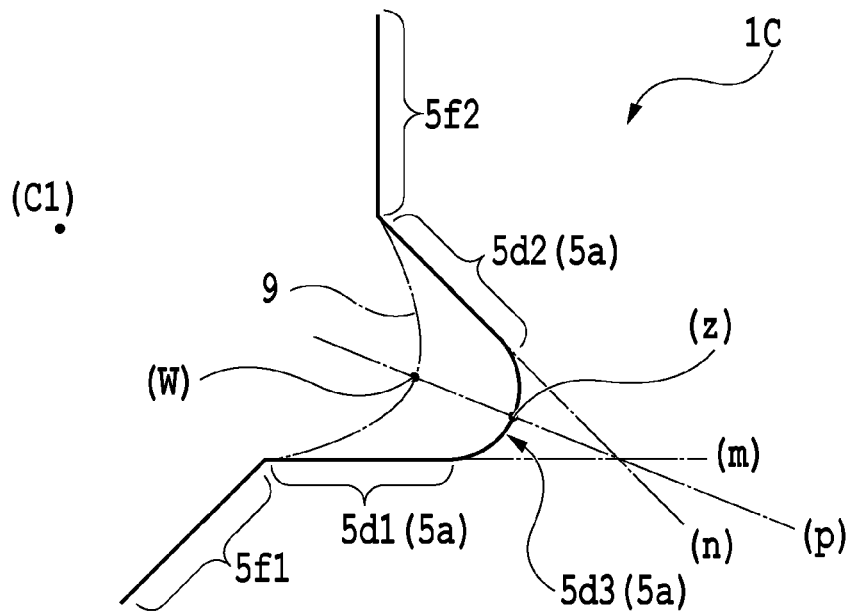
FIG. 10 is a partial enlarged view illustrating the cutting insert of the second embodiment in which the first long cutting edge and the first short cutting edge intersect with each other at an obtuse angle and the second long cutting edge and the second short cutting edge intersect with each other at an obtuse angle.

As another second embodiment variation, as illustrated in FIG. 10, a shape in which the first long cutting edge 5f1 and the first short cutting edge 5d1 intersect with each other at an obtuse angle, and the second long cutting edge 5f2 and the second short cutting edge 5d2 intersect with each other at an obtuse angle is also possible. In this case, the cutting insert 1 has a shape in which it can be attached to both drills of right rotation and left rotation and can generate divided chips.

It should be noted that the intersection line CN1 or the intersection line CN2 is not required to be present explicitly, but may be a rounded connection portion extending between the upper face 2 and the lower face 3. That is, the connection portion may be appropriately rounded, to thereby prevent a defect in the ridge line. In such a case, the roundness is ignored, and a virtual intersection line obtained by extending the main side face 4m1 and the sub side face 4s1, respectively, and a virtual intersection line obtained by extending the main side face 4m2 and the sub side face 4s2, respectively, are set to be the intersection line CN1 or the intersection line CN2.

(Third Embodiment)

Subsequently, a third embodiment of a cutting insert of the present invention will be described. In the drawings used in the description below, the portions having the functions similar to those in the above-described first embodiment are given the same reference numerals as those used in the above-illustrated drawings.

Figure 11:
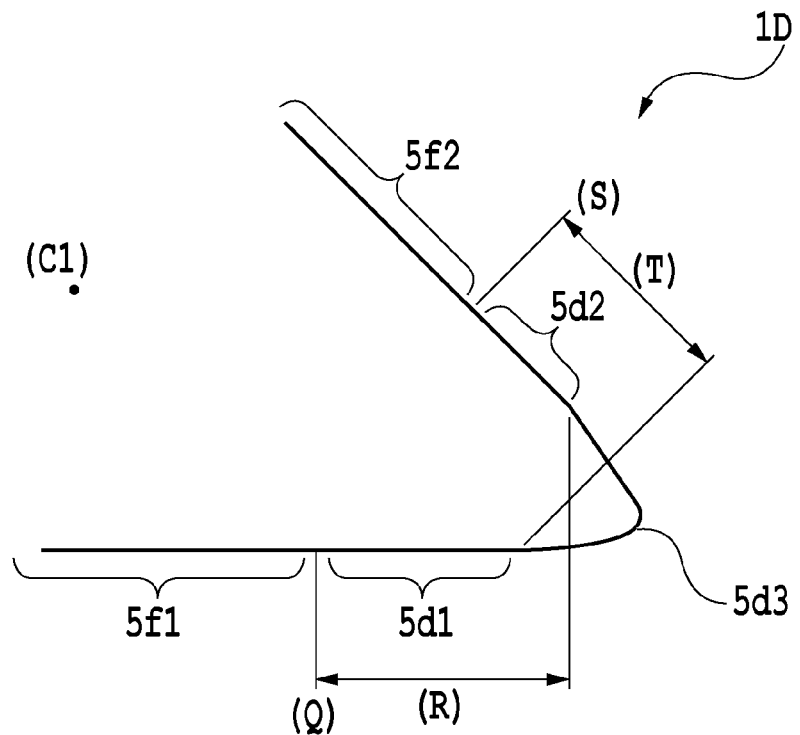
FIG. 11 is a partial enlarged view illustrating one of cutting edge groups constituting an outer cutting edge of a cutting insert of a third embodiment in an enlarged manner.

FIG. 11 is a partial enlarged view illustrated by enlarging one of the cutting edge groups of the cutting insert of the third embodiment. A first virtual line (Q) passes through an intersection portion (connection portion) between the first long cutting edge 5f1 and the first short cutting edge 5d1, the first virtual line (Q) being perpendicular to the first long cutting edge 5f1. A second virtual line (S) passes through an intersection portion (connection portion) between the second long cutting edge 5f2 and the second short cutting edge 5d2, the second virtual line (S) being perpendicular to the second long cutting edge 5f2. As illustrated in FIG. 11, when the cutting edge group of a cutting insert 1D of the third embodiment is seen on top view, a first perpendicular distance (R) from the first virtual line (Q) to an intersection portion (connection portion) between the arc-shaped cutting edge 5d3 and the second short cutting edge 5d2 is larger than a second perpendicular distance (T) from the second virtual line (S) to an intersection portion between the arc-shaped cutting edge 5*d*3 and the first short cutting edge 5*d*1. By the cutting edge group being configured having such a shape, cutting resistance is reduced.

Figure 12:
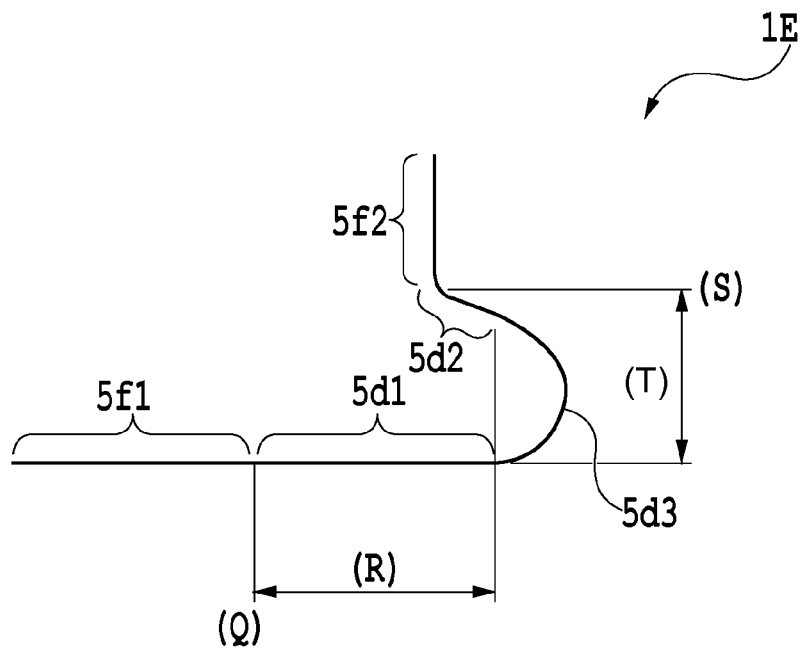
FIG. 12 is a top view illustrating the cutting insert of the third embodiment in which a first long cutting edge and a first short cutting edge intersect with each other at an obtuse angle.

In the cutting insert 1D of the embodiment, there is no particular limitation on the intersecting angle between the first long cutting edge 5*f*1 and the first short cutting edge 5*d*1 and the intersecting angle between the second long cutting edge 5*f*2 and the second short cutting edge 5*d*2. Therefore, as illustrated in the third embodiment first variation FIG. 12, a cutting insert 1E can be formed so as to have a shape in which the first long cutting edge 5*f*1 and the first short cutting edge 5*d*1 are arranged linearly, and the second long cutting edge 5*f*2 and the second short cutting edge 5*d*2 intersect with each other at an obtuse angle. Since the cutting edge group is configured having such shapes, the cutting resistance is reduced and relief to the hole wall, that is, an interval between the hole wall and the cutting insert 1 is largely ensured, and thus biting of generated chips is prevented.

Figure 13:
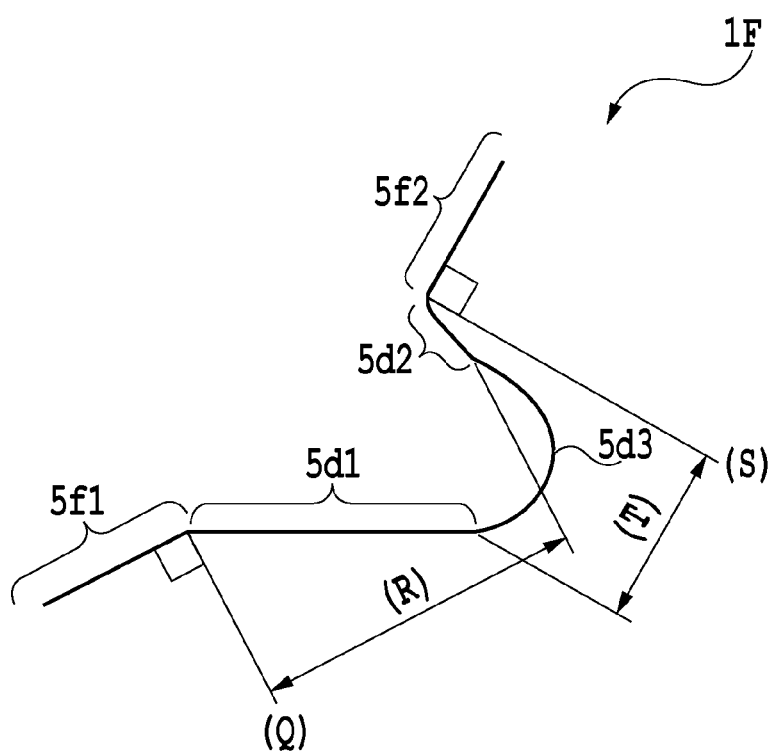
FIG. 13 is a top view illustrating the cutting insert of the third embodiment in which the first long cutting edge and the first short cutting edge intersect with each other at an obtuse angle and the second long cutting edge and the second short cutting edge intersect with each other at an obtuse angle.

Moreover, as in a cutting insert 1F illustrated in the third embodiment second variation of FIG. 13, a shape is also possible in which the first long cutting edge 5*f*1 and the first short cutting edge 5*d*1 intersect with each other at an obtuse angle and the second long cutting edge 5*f*2 and the second short cutting edge 5*d*2 intersect with each other at an obtuse angle. In this case, the cutting resistance is reduced and also, divided chips can be generated.

Figure 14A:
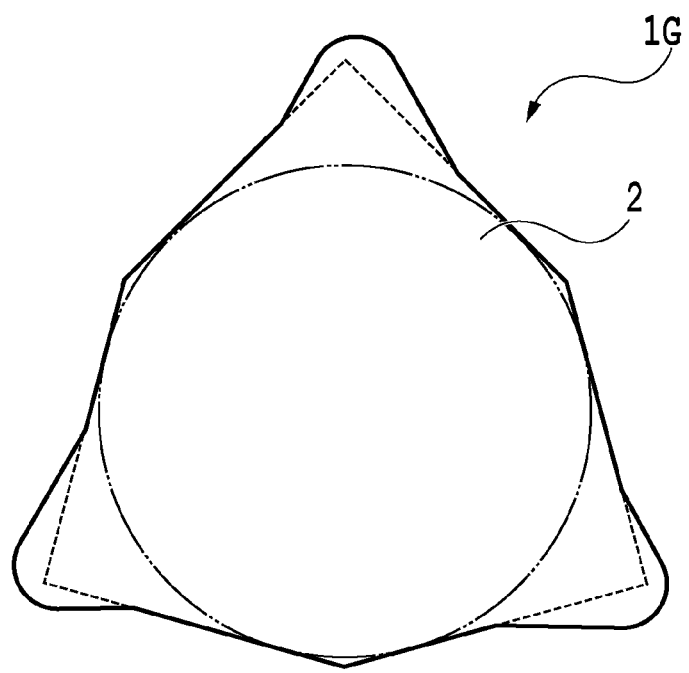
FIG. 14A is a top view illustrating a shape of another rake face of the cutting insert of the present invention.
Figure 14B:
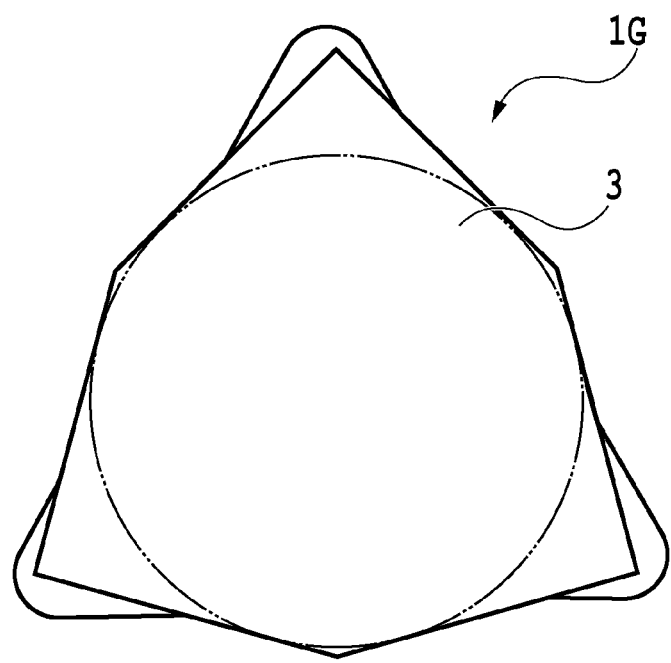
FIG. 14B is a bottom view of the cutting insert in FIG. 14A.
Figure 15A:
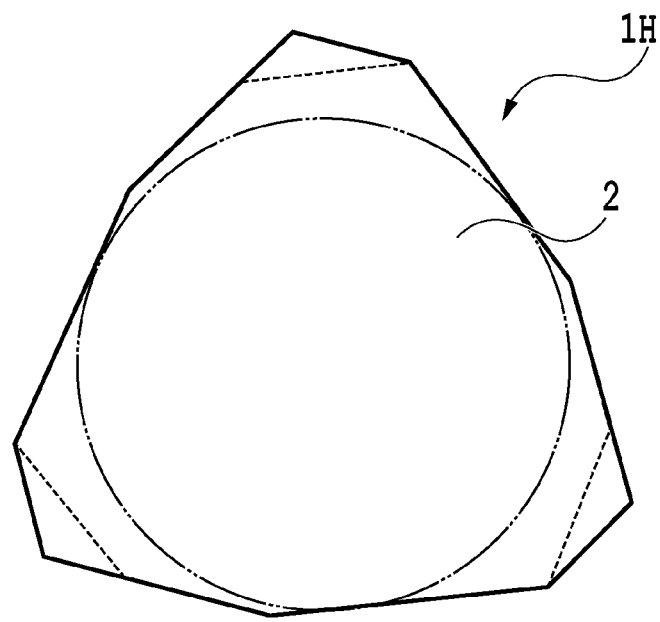
FIG. 15A is a top view illustrating a shape of still another rake face of the cutting insert of the present invention.
Figure 15B:
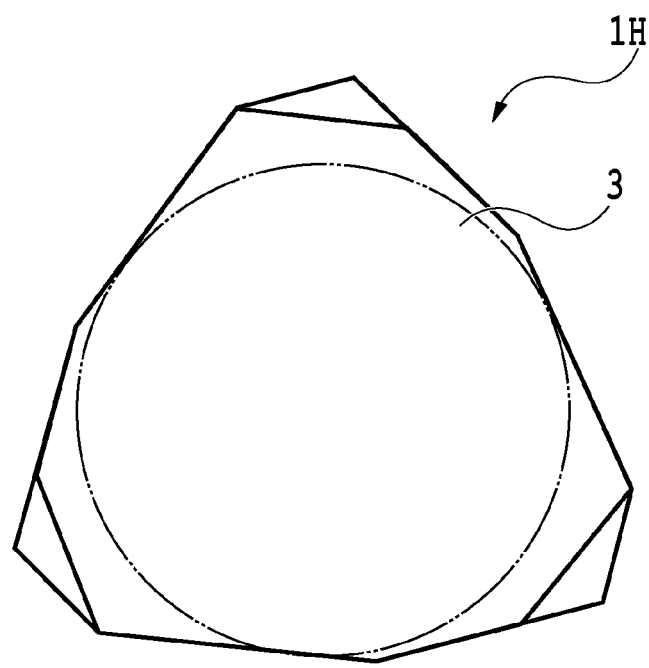
FIG. 15B is a bottom view of the cutting insert in FIG. 15A.

The cutting insert and the indexable rotary cutting tool of the present invention are not limited to the above-described embodiments. For example, as to the profile shapes of the upper face and the lower face of the cutting insert, there can also be employed another polygonal shape instead of the above-described substantially triangular shape, or a shape in which the middle of a side is bent as in the case of a cutting insert 1G illustrated in FIGS. 14A and 14B and a cutting insert 1H illustrated in FIGS. 15A and 15B. Thus, in FIGS. 14A and 14B, in both the top plan view and the bottom plan view, an inscribed circle is tangent to each insert side at two spaced apart points. And in FIGS. 15A and 15B, in both the top plan view and the bottom plan view, an inscribed circle is tangent to each insert side at only a single point.

Also regarding the indexable rotary cutting tool of the present invention, arrangement is not limited to that in which the cutting insert has a radial rake of 0°. That is, the arrangement method of the cutting insert can be changed as appropriate in accordance with the type of a work material. For example, when cast iron whose chips can be easily divided into small pieces is to be machined, the radial rake can be intentionally made negative in order to give priority to cutting edge strength. If the size of the radial rake is within a range of −5° and more and +5° or less, the indexable rotary cutting tool of the present invention can handle almost every type of a work material sufficiently. Moreover, the above-described indexable drill is of a double cutting edge type, but the number of the cutting edges may be 3 or more. In that case, the tool body needs one or more outer insert seats and one or more center-side insert seats. The other insert seats are adjusted as appropriate so that the cutting edge fills a gap between the outer periphery and the center. Moreover, the indexable rotary cutting tool is not limited to the drill, but a cutting tool for plunging or a cutting tool used by being pressed in a main spindle direction of an end mill attached with a bottom edge and the like can also be used.

Although the typical embodiments of the present invention were described, the present invention is capable of various modifications, and replacement and modifications are possible as long as the present invention does not depart from the spirit and scope defined by claims of the present application.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A plate-like cutting insert comprising:
a substantially polygonal upper face;
a substantially polygonal lower face; and
a plurality of side faces extending between the upper face and the lower face, wherein,
the cutting insert comprises a first cutting edge formed at an upper intersection portion where the upper face and the plurality of side faces intersect with each other;
the first cutting edge comprises at least one curved corner cutting edge formed at a corner portion of the upper face, and at least one linear cutting edge connected to the curved corner cutting edge;
the plurality of side faces comprise at least one main side face including a plane constituting a flank of the at least one linear cutting edge, and at least one sub side face constituting a flank of the at least one corner cutting edge;
the at least one main side face comprises a relief angle of 0°;
the at least one sub side face comprises a relief angle larger than 0°;
the cutting insert comprises at least one second cutting edge formed at a lower intersection portion where the at least one main side face and the lower face intersect with each other;
the upper face and the lower face differ from one another in; and
the upper face and the lower face both comprise rake faces.

2. The cutting insert according to claim 1, wherein
the first cutting edge comprises exactly three sets of cutting edges, each set of cutting edges including one corner cutting edge and at least one linear cutting edge.

3. The cutting insert according to claim 1, wherein
the at least one corner cutting edge comprises an arc-shaped cutting edge, a first short cutting edge connected to a first end portion of the arc-shaped cutting edge, and a second short cutting edge connected to an opposite, second end portion of the arc-shaped cutting edge;
a first linear cutting edge is connected to the first short cutting edge, on a side away from the first end portion of arc-shaped cutting edge;
a second linear cutting edge is connected to the second short cutting edge, on a side away from the second end portion of the arc-shaped cutting edge;
on plan view, a first intersection point between a virtual plane bisecting a first angle formed by the first short cutting edge and the second short cutting edge, the virtual plane being orthogonal to the upper face and the arc-shaped cutting edge, is located farther from a central axis line of the cutting insert, than a second intersection point between the virtual plane and the lower intersection portion between the plurality of side faces and the lower face; and
when viewed from a direction perpendicular to a first main side face including the first linear cutting edge, an intersection line between the first main side face and the sub side face corresponding to the first short cutting edge is orthogonal to the first linear cutting edge, and when viewed from a direction perpendicular to a second main side face including the second linear cutting edge, an intersection line between the second main side face and the sub side face corresponding to the second short cutting edge is orthogonal to the second linear cutting edge.

4. The cutting insert according to claim 1, wherein the at least one corner cutting edge comprises an arc-shaped cutting edge, a first short cutting edge connected to a first end portion of the arc-shaped cutting edge, and a second short cutting edge connected to an opposite, second end portion of the arc-shaped cutting edge;

a first linear cutting edge is connected to the first short cutting edge, on a side away from the first end portion of arc-shaped cutting edge;

a second linear cutting edge is connected to the second short cutting edge, on a side away from the second end portion of the arc-shaped cutting edge;

a first virtual line (Q) passes through an intersection portion between the first linear cutting edge and the first short cutting edge, the first virtual line (Q) being perpendicular to the first linear cutting edge;

a second virtual line (S) passes through an intersection portion between the second linear cutting edge and the second short cutting edge, the second virtual line (S) being perpendicular to the second linear cutting edge;

on plan view of the upper surface, a first perpendicular distance (R) from the first virtual line (Q) to an intersection portion between the arc-shaped cutting edge and the second short cutting edge, is larger than a second perpendicular distance from the second virtual line (S) to an intersection portion between the arc-shaped cutting edge and the first short cutting edge.

5. The cutting insert according to claim 1, wherein the at least one linear cutting edge comprises first and second linear cutting edges connected to each other, having different lengths and forming an obtuse angle between themselves in a plan view.

6. The cutting insert according to claim 1, wherein the first cutting edge comprises three sets of cutting edges, each set of cutting edges including one corner cutting edge and at least one linear cutting edge;

in each set, the at least one linear cutting edge comprises first and second linear cutting edges which: are connected to each other, have different lengths, form an obtuse angle between themselves on plan view, and are connected to different corner cutting edges, and an outer shape of the upper face on plan view is 120° rotationally symmetric with respect to a central axis line of the cutting insert.

7. The cutting insert according to claim 1, comprising exactly three corner cutting edges, each pair of adjacent corner cutting edges connected to one another by at least one linear cutting edge; wherein each at least one linear cutting edge comprises first and second linear cutting edges which: are connected to each other, have different lengths, form an obtuse angle between themselves on plan view, and are connected to different corner cutting edges, and an outer shape of the upper face formed by the corner cutting edges and the linear cutting edges is 120° rotationally symmetric with respect to a central axis line of the cutting insert.

8. An indexable rotary cutting tool having two or more plate-like cutting inserts mounted in a tool body, wherein:

each cutting insert comprises:

a substantially polygonal upper face;

a substantially polygonal lower face; and a plurality of side faces extending between the upper face and the lower face, wherein, the cutting insert comprises a first cutting edge formed at an upper intersection portion where the upper face and the plurality of side faces intersect with each other;

the first cutting edge comprises at least one curved corner cutting edge formed at a corner portion of the upper face, and at least one linear cutting edge connected to the curved corner cutting edge;

the plurality of side faces comprise at least one main side face including a plane constituting a flank of the at least one linear cutting edge, and at least one sub side face constituting a flank of the at least one corner cutting edge;

the at least one main side face comprises a relief angle of 0°;

the at least one sub side face comprises a relief angle larger than 0°; and the cutting insert comprises at least one second cutting edge formed at a lower intersection portion where the at least one main side face and the lower face intersect with each other;

a first cutting insert is arranged so that the first cutting edge thereof is involved in cutting;

a second cutting insert is arranged so that the second cutting edge thereof is involved in cutting;

each cutting insert comprises a plurality of main side faces and sub side faces; and in the sub side faces of the second cutting insert, a rotation trajectory of each ridge line of the sub side face connected to the second cutting edge involved in the cutting and located closest to the center side of the tool body overlaps with a rotation trajectory of the first cutting edge of the first cutting insert.

9. The indexable rotary cutting tool according to claim 8, wherein in the second cutting insert, at the second intersection portion where the lower face and the plurality of side faces intersect with each other, defining an outer shape of the lower face of the second cutting insert, the second intersection portion connected to the at least one sub side face has a linear portion and a curved portion, and the second cutting insert is mounted on the tool body so that the linear portion is parallel to an axis of rotation of the tool body.

10. The indexable rotary cutting tool according to claim 8, wherein all the cutting inserts attached to the tool body are attached so that an axial rake becomes negative.

11. The indexable rotary cutting tool according to claim 8, wherein the first cutting insert is arranged so that the first cutting edge thereof involved in cutting is arranged so that a radial rake becomes 0° or more.

12. The indexable rotary cutting tool according to claim 8, wherein the tool is configured for drilling.

13. The indexable rotary cutting tool according to claim 8, wherein on a side face of the tool body, first and second chip discharge grooves are formed, and the first and second chip discharge grooves have shapes different from each other.

14. The indexable rotary cutting tool according to claim 13, wherein the first chip discharge groove comprises a shape of an approximately ¼ arc on leading-edge view, and a groove face including a curved face having an appropriate length from the leading end is formed in a groove wall closer to the center of the second chip discharge groove.

15. The cutting insert according to claim 1, wherein:
the upper surface comprises an upper chip breaker;
the lower surface comprises a lower chip breaker; and
the upper chip breaker and the lower chip breaker differ from one another in shape.

16. The cutting insert according to claim 1, wherein:
the upper face comprises an outer cutting edge formed at the intersection of the upper face and the plurality of side faces;
the lower face comprises an inner cutting edge formed at the intersection of the lower face and the plurality of side faces; and
the outer cutting edge and the inner cutting edge differ from one another in shape.

17. The cutting insert according to claim 1, wherein:
the at least one linear cutting edge and the at least one second cutting edge differ from one another in shape.

18. The cutting insert according to claim 1, wherein:
the upper surface comprises an upper chip breaker;
the lower surface comprises a lower chip breaker;
the upper chip breaker and the lower chip breaker differ from one another in shape;
the upper face comprises an outer cutting edge formed at the intersection of the upper face and the plurality of side faces;
the lower face comprises an inner cutting edge formed at the intersection of the lower face and the plurality of side faces; and
the outer cutting edge and the inner cutting edge differ from one another in shape.

19. The cutting insert according to claim 1, wherein:
the upper surface comprises an upper chip breaker;
the lower surface comprises a lower chip breaker;
the upper chip breaker and the lower chip breaker differ from one another in shape;
the upper face comprises an outer cutting edge formed at the intersection of the upper face and the plurality of side faces;
the lower face comprises an inner cutting edge formed at the intersection of the lower face and the plurality of side faces;
the outer cutting edge and the inner cutting edge differ from one another in shape; and
the at least one linear cutting edge and the at least one second cutting edge differ from one another in shape.

* * * * *